United States Patent [19]
Bonet et al.

[11] Patent Number: 6,034,562
[45] Date of Patent: Mar. 7, 2000

[54] MIXED SIGNAL PROCESSING SYSTEM AND METHOD FOR POWERING SAME

[75] Inventors: Luis Augusto Bonet; Alan Lee Westwick; Mauricio Arturo Zavaleta; James Alan Tuvell; David E. Bush, all of Austin, Tex.; Michael Dale Floyd, Plainfield, Ind.

[73] Assignee: Motorola, Inc., Schaumburg, Ill.

[21] Appl. No.: 08/442,742

[22] Filed: May 17, 1995

Related U.S. Application Data

[63] Continuation of application No. 08/297,439, Aug. 29, 1994, abandoned, which is a continuation of application No. 07/788,977, Nov. 7, 1991, abandoned.

[51] Int. Cl.$^7$ .................................................. G05F 5/42
[52] U.S. Cl. .......................................... 327/541; 327/530
[58] Field of Search .............................. 307/296.1, 296.2, 307/296.6, 529, 47; 363/60; 365/189.09, 226; 395/750; 327/538, 530, 541, 543

[56] References Cited

U.S. PATENT DOCUMENTS

| | | | |
|---|---|---|---|
| 4,188,585 | 2/1980 | Wissel et al. ............................ 325/492 |
| 4,356,412 | 10/1982 | Moench et al. ...................... 307/296.2 |
| 4,485,433 | 11/1984 | Topich ................................. 307/296.2 |
| 4,670,673 | 6/1987 | Varadarajan ............................ 307/475 |
| 4,837,460 | 6/1989 | Uchida ................................. 307/296.2 |
| 4,839,787 | 6/1989 | Kojima et al. ............................ 363/60 |
| 4,868,908 | 9/1989 | Pless et al. ............................... 323/267 |
| 4,935,644 | 6/1990 | Tsujimoto ............................. 307/296.1 |
| 4,947,061 | 8/1990 | Metz et al. ................................ 307/475 |
| 5,021,680 | 6/1991 | Zaw Win et al. .................... 307/296.1 |
| 5,023,476 | 6/1991 | Watanabe et al. ................... 307/296.1 |
| 5,029,282 | 7/1991 | Ito ......................................... 307/296.2 |
| 5,043,605 | 8/1991 | Gabara .................................... 307/475 |
| 5,045,772 | 9/1991 | Nishiwaki et al. .................. 307/296.1 |
| 5,063,304 | 11/1991 | Iyengar ................................ 307/296.6 |
| 5,066,873 | 11/1991 | Chan et al. .......................... 307/296.8 |
| 5,140,196 | 8/1992 | Shepherd ................................ 307/475 |

FOREIGN PATENT DOCUMENTS

| | | |
|---|---|---|
| 0292269 | 11/1988 | European Pat. Off. . |
| 2 078 021 | 6/1980 | United Kingdom ............ H02M 3/02 |
| 2 079 498 | 7/1980 | United Kingdom ........... G04C 10/00 |

*Primary Examiner*—Terry D. Cunningham
*Attorney, Agent, or Firm*—Paul J. Polansky

[57] ABSTRACT

A mixed signal processing system (22) includes digital (28) and analog (29) systems and is powered by a variable external voltage, such as a battery voltage. A voltage regulator (41) regulates the battery voltage to a nominal potential less than the battery voltage. The voltage regulator (41) provides the regulated voltage to a digital subsystem (51) of the digital system (28). A regulated charge pump (43) provides a voltage which is above the battery voltage and substantially constant due to regulation. The regulated charge pump (43) provides the regulated charge-pumped voltage to an analog subsystem (61) of the analog system (29) for better analog operation. A level shifter (44) equalizes signal levels between the digital (28) and analog (29) systems.

20 Claims, 5 Drawing Sheets

MIXED SIGNAL PROCESSING SYSTEM AND METHOD FOR POWERING SAME

This application is a continuation of prior application Ser. No. 08/297,439 filed on Aug. 29, 1994, now abandoned, which is a continuation of prior application Ser. No. 07/788,977 filed on Nov. 7, 1991, now abandoned.

CROSS REFERENCE TO RELATED, COPENDING APPLICATION

Related, copending application is application docket no. SC-01349A, filed concurrently herewith, by Mauricio A. Zavaleta, and assigned to the assignee hereof, entitled "Regulated Charge Pump and Method Therefor".

FIELD OF THE INVENTION

This invention relates generally to analog and digital systems, and more particularly, to mixed analog and digital signal processing systems.

BACKGROUND OF THE INVENTION

Telecommunications products often perform mixed signal processing, which is simultaneous processing of both analog and digital signals. For example, a digital cordless telephone handset receives an analog speech signal via a microphone, converts the speech signal into a digital speech signal, compresses the digital speech signal, modulates the compressed signal at a radio frequency (RF), and transmits the modulated RF signal through an antenna. The transmitted RF signal is received by a nearby base station, converted back to an analog signal, and ultimately relayed to the destination telephone. When a similar signal is received from the destination telephone, the telephone signal undergoes the same process; the base station then transmits a corresponding digital RF signal. The RF signal is received at the handset via the antenna, demodulated, decompressed, and converted into an analog speech signal which drives a speaker in the handset. Thus, both analog and digital functions are necessary in the operation of a digital cordless telephone handset.

However, analog and digital circuitry used in mixed signal processing applications have different power supply requirements. For example, digital circuits are commonly manufactured with complementary metal-oxide-semiconductor (CMOS) technology. CMOS has the advantage that power consumption is relatively low compared to other technologies. Digital CMOS circuits operate with a wide range of power supply voltages, for example from the conventional +5.0 volts down to +3.0 volts and below. At higher power supply voltages, CMOS circuits are faster but have other problems. They consume more power than at lower power supply voltages. They also have reliability problems above certain voltages. Since digital CMOS logic provides logic levels which are essentially full supply, the higher supply voltage is driven onto gates of CMOS transistors. If the voltage at the gate of a CMOS transistor is too large, gate rupture or gate oxide degradation may result. Hence, power supply voltages must be limited to prevent the reliability problems. On the other hand, analog circuitry often requires a higher minimum power supply voltage than digital circuitry. For example, many amplifiers have inherent power supply headroom limitations which cause the amplifiers to distort the output signal if the power supply voltage compresses too much.

To complicate matters, digital cordless telephone handsets and many other mixed signal processing environments require battery operation. The battery may be, for example, one or more rechargeable nickel-cadmium (nicad) batteries or their equivalent. However, battery voltages vary widely between recharges. For example, a single nicad battery, type AA, may reach a voltage of 1.7 to 1.8 volts immediately after a recharge, but drop to a voltage of 0.9 to 1.0 volts before going dead. Thus, three type AA nicad batteries provide a voltage range from about 5.4 volts to about 2.7 volts between recharges.

Known mixed signal processing systems are not effective in operating within the differing power supply requirements. For example, a power supply voltage provided by a battery may be input to a charge pump to increase the voltage provided to some of the internal circuitry. In this case, the digital circuitry receives the battery voltage, and the analog circuitry receives the higher, charge-pumped voltage. Obviously, such designs require a narrow tolerance of battery voltages so that both the digital and analog circuitry are able to function properly. Thus, because of their variability in voltage, nicad and other types of batteries are poorly suited for these types of systems. If the battery power supply voltage is near the top of its range, then the charge-pumped voltage is very large and significantly increases power consumption and reduces reliability. As power consumption increases, battery life shortens.

SUMMARY OF THE INVENTION

Accordingly, there is provided, in one form, a mixed signal processing system comprising means coupled to first and common power supply voltage terminals respectively providing first and common power supply voltages thereon for providing a second power supply voltage, means for providing a third power supply voltage, a digital subsystem, and an analog subsystem. The second power supply voltage is provided at a first predetermined potential referenced to the common power supply voltage. An absolute value of the first predetermined potential is less than an absolute value of a nominal potential of the first power supply voltage and is characterized as being substantially constant with respect to changes in the first power supply voltage. The means for providing the third power supply voltage is coupled to the first and common power supply voltage terminals. The third power supply voltage is provided at a second predetermined potential referenced to the common power supply voltage. An absolute value of the second predetermined potential is greater than the absolute value of the nominal potential of the first power supply voltage and is characterized as being substantially constant with respect to changes in the first power supply voltage. The digital subsystem is coupled to the common power supply voltage terminal and receives the second power supply voltage at a power supply voltage terminal thereof and a digital signal at an input terminal thereof. The analog subsystem is coupled to the digital subsystem and to the common power supply voltage terminal and receives the third power supply voltage at a power supply voltage terminal thereof and an analog signal at an input terminal thereof.

In another form, there is provided a method for improving performance of a mixed signal processing system powered by an external voltage, comprising the steps of regulating the external voltage to a first predetermined level; providing the regulated external voltage to a digital system providing at least one digital signal to said digital system of the mixed signal processing system; charge pumping the external voltage; regulating the charge-pumped external voltage to a second predetermined level; providing the regulated charge-pumped external voltage to an analog system of the mixed signal processing system; and providing at least one analog signal to said analog system.

These and other features and advantages will be more clearly understood from the following detailed description taken in conjunction with the accompanying drawings.

DETAILED DESCRIPTION OF THE INVENTION

Figure 1:
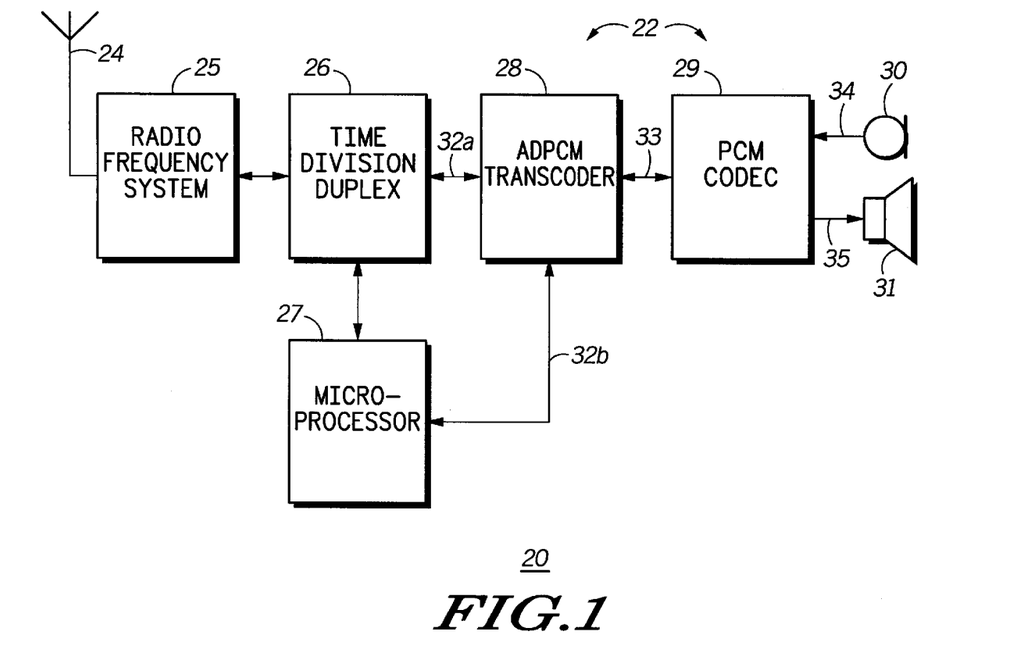
FIG. 1 illustrates in block form a digital cordless telephone handset utilizing a mixed signal processing system in accordance with the present invention.

FIG. 1 illustrates in block form a digital cordless telephone handset 20 utilizing a mixed signal processing system 22 in accordance with the present invention. Handset 20 implements a standard protocol, such as the U.K. Cordless Telephone, Second Generation (CT-2) or the Digital European Cordless Telephone (DECT) standard. For example, according to the CT-2protocol, telephone signals are received and transmitted digitally in packets in a half-duplex or ping-pong scheme between handset 20 and a base station (not shown in FIG. 1). An antenna 24 is used for transmitting and receiving radio-frequency (RF) representations of telephonic signals. An RF system 25 is connected to antenna 24 for receiving and demodulating, and transmitting and modulating, digital streams of telephonic data. As used here, the term "signal" refers to a time-varying electrical signal, and the term "digital signal" refers to a series of digital samples of the signal. A "packet" includes a portion of the digital signal, or alternatively, a specified number of digital samples of the telephone signal, along with digital signaling bits.

A packet from the base station is received as a modulated RF signal on antenna 24. Radio frequency system 25 receives the RF signal and demodulates it. The modulation scheme is a two-level FSK shaped by an approximately Gaussian filter, as described in the CT-2 Common Air Interface Specification. The packet is then presented to a time division duplex block 26. Time division duplex block 26 splits the packet into its two constituent components, making the signalling bits available to microprocessor 27. Time division duplex block 26 makes the compressed digital signal available to mixed signal processing system 22 through input and output signals 32a. Subsequently, microprocessor 27 reads the signalling bits and performs associated signalling functions, such as call setup and disconnect.

Mixed signal processing system 22 includes an adaptive differential pulse code modulation (ADPCM) transcoder 28, and a pulse code modulation (PCM) coder-decoder (codec) 29. ADPCM transcoder 28 decompresses the compressed digital signal received from time division duplex block 26 by a conventional algorithm, such as the CCITT Recommendation G.721 or the American National Standard T1.301-1988. When decompressed, the digital signal exists as digital PCM data compressed by a conventional algorithm such as A-law or $\mu$-law. ADPCM transcoder is connected via input and output signals 32b to microprocessor 27. Microprocessor 27 initializes and controls the operation of ADPCM transcoder 28 through input and output signals 32b. PCM codec 29 receives the PCM data via input and output signals 33, performs A-law or $\mu$-law decompression to form an analog telephone signal, and provides the analog telephone signal to a speaker 31 and a ringer (not shown in FIG. 1) via output signals 35. Additional interface circuitry between ADPCM transcoder 28 and PCM codec 29 is not shown in FIG. 1.

A microphone 30 provides an analog telephone signal via input signal lines 34 to PCM codec 29. PCM codec 29 converts the analog telephone signal to a digital telephone signal and compresses it according to the A-law or $\mu$-law algorithm, and provides the digital telephone signal to ADPCM transcoder 28 via input and output signals 33. ADPCM transcoder 28 in turn compresses the digital telephone signal according to the conventional algorithm (such as the CCITT G.721 or ANSI T1.301-1988 standard) and provides the compressed digital signal to time division duplex block 26. Time division duplex block 26 then combines signalling bits from microprocessor 27 with the compressed digital data from APDCM transcoder 28 to form a CT-2 packet. Time division duplex block 26 provides the CT-2 packet to radio frequency system 25, which modulates it and provides it as an RF signal to antenna 24, where it is radiated and eventually received by the base station. PCM codec 29 performs the function of a conventional integrated circuit, such as the Motorola MC145554 $\mu$-law PCM Codec-Filter or the Motorola MC145557 A-law PCM Codec-Filter. ADPCM transcoder 28 also performs the function of a conventional integrated circuit, such as the Motorola MC145532 ADPCM Transcoder.

PCM codec filter 29 is primarily analog, while ADPCM transcoder 28 is primarily digital; however, mixed signal processing system 22 is required to operate from a single battery power supply formed typically by three type AA batteries (not shown in FIG. 1). Mixed signal processing system 22 must operate on battery voltages varying from 2.7 volts to 5.25 volts and still meet the CT-2 specification. At the same time, power consumption must be kept to a minimum in order to maximize battery life. ADPCM transcoder 28 must perform its operation within the time required to process packets to operate on continuous, real-time speech signals. Also, reliable operation is required. Thus, a new approach which solves these problems is needed. Mixed signal processing system 22 satisfies these requirements as is now illustrated with reference to FIG. 2.

Figure 2:
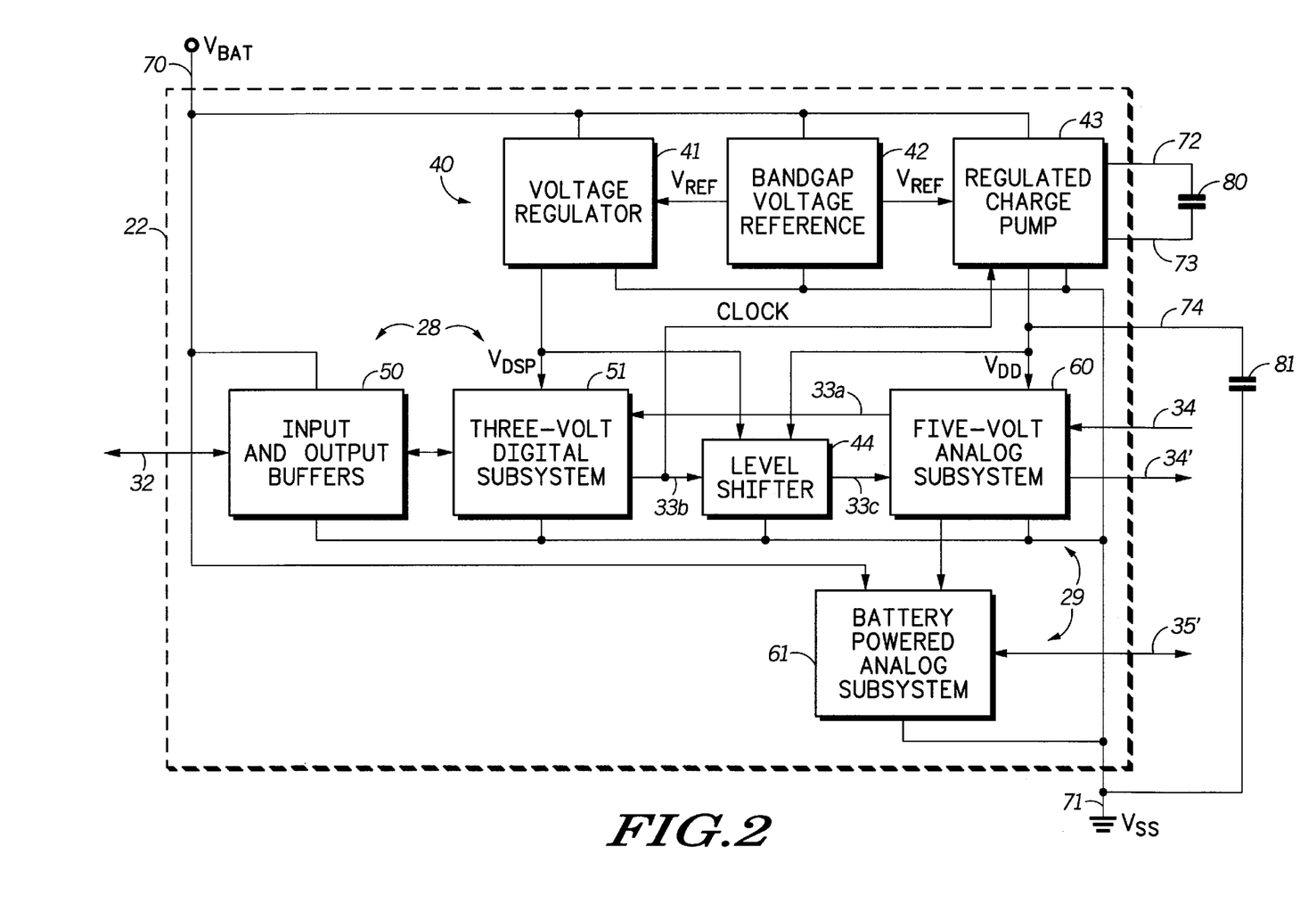
FIG. 2 illustrates in partial block form and partial schematic form the mixed signal processing system of FIG. 1.

FIG. 2 illustrates in partial block form and partial schematic form mixed signal processing system 22 of FIG. 1. Mixed signal processing system 22 includes ADPCM transcoder 28 and PCM codec filter 29 as previously illustrated in FIG. 1. In addition, mixed signal processing system 22 includes a power supply subsystem 40 having a voltage regulator 41, a bandgap voltage reference 42, and a regulated charge pump 43, a level shifter 44, and several power supply terminals and signal lines. The terminals include a terminal 70 for receiving a voltage labelled "$V_{BAT}$", a terminal 71 for receiving a voltage labelled "$V_{SS}$", a first capacitor terminal 72, a second capacitor terminal 73, and a third capacitor terminal 74. The signal lines include input and output signal lines 32, input signal lines 34, output signal lines 34', and input and output signal lines 35'. Signal lines corresponding to signal lines in FIG. 1 are given the same reference number. However, input and output signal lines 32 of FIG. 2 include input and output signal lines 32a and 32b as previously illustrated in FIG. 1, and input and output signal lines 35' include output signal line 35 of FIG. 1 and other input and output signal lines not shown in FIG. 1. ADPCM transcoder 28 includes input and output buffers 50, and a three-volt digital subsystem 51. PCM codec 29 includes a five-volt analog subsystem 60, and a battery-powered analog subsystem 61. A first capacitor 80 is connected between terminals 72 and 73, and a second capacitor 81 is connected between terminals 74 and 71.

Figure 6:
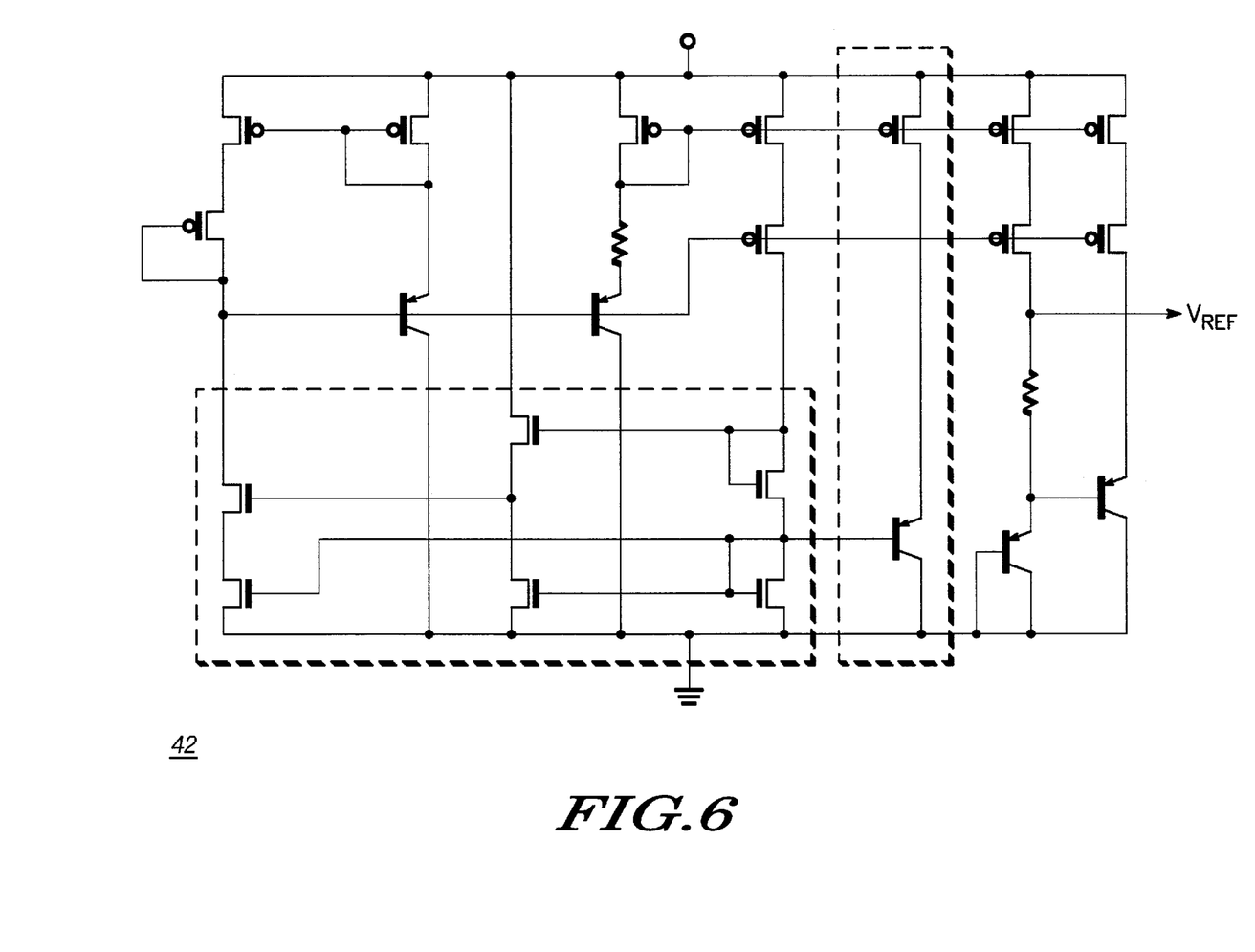
FIG. 6 illustrates in schematic form the bandgap voltage reference used in the mixed signal processing system of FIG. 2.

$V_{BAT}$ is a battery voltage provided by, for example, three type AA nicad batteries (not shown in FIG. 2) having a nominal voltage of 3.75 volts but varying between 2.7 and 5.4 volts between recharges. $V_{SS}$ is a common, or ground power supply voltage having a nominal value of zero volts. Thus, mixed signal processing system 22 is only connected to a single, battery-derived power supply. In power supply subsystem 40, bandgap voltage reference 42 is connected to $V_{BAT}$ and $V_{SS}$ and provides a stable, precise voltage labelled "$V_{REF}$" in response. Bandgap voltage reference 42 is a bandgap voltage reference circuit which is able to operate at power supply voltages down to approximately 2.7 volts, FIG. 6 illustrates in schematic form bandgap voltage reference 42 used in mixed signal processing system 22 of FIG. 2. However it should be apparent to those skilled in the art that other low-voltage bandgap voltage references may be used.

Voltage regulator 41 is connected between $V_{BAT}$ and $V_{SS}$, and receives voltage $V_{REF}$ to provide an internal reference. Voltage regulator 41 is a conventional CMOS voltage regulator which provides a regulated output voltage, labelled "$V_{DSP}$". $V_{DSP}$ has a nominal value of 3.0 volts which remains substantially constant with variations in $V_{BAT}$ until $V_{BAT}$ approaches 3.0 volts. As $V_{BAT}$ falls below 3.0 volts (when the voltage of the nicad batteries falls due to discharge), $V_{DSP}$ likewise compresses.

Power supply subsystem 40 also includes regulated charge pump 43, which is connected between $V_{BAT}$ and $V_{SS}$. Regulated charge pump 43 is connected to the first terminal of first capacitor 80 via terminal 72, to the second terminal of first capacitor 80 via terminal 73, and to the first terminal of second capacitor 81 via terminal 74, receives voltage $V_{REF}$ and a dock signal labelled "CLOCK", and provides an output voltage labelled $V_{DD}$. Regulated charge pump 43 combines two conventional functions. First, regulated charge pump 43 increases the voltage of $V_{BAT}$ through docked capacitive charge pumping. In a preferred embodiment, mixed signal processing system 22 is included in a single monolithic integrated circuit. Capacitors 80 and 81 are too large to be provided monolithically and thus are external to the integrated circuit. Second, regulated charge pump 43 regulates the charge-pumped voltage to provide a voltage labelled "$V_{DD}$". $V_{DD}$ has a nominal voltage of approximately 5.0 volts, but remains substantially constant as $V_{BAT}$ changes (due to the regulation).

ADPCM transcoder 28 is a conventional ADPCM transcoder modified to separate internal circuitry in accordance with differing power supply requirements. In ADPCM transcoder 28, input and output buffers 50 are separated from three-volt digital subsystem 51 and are connected between $V_{BAT}$ and $V_{SS}$, and provide and receive signals via input and output signal lines 32. Three-volt digital subsystem 51 performs all the functions of a conventional ADPCM transcoder except for the functions provided by input and output buffers 50. Subsystem 51 is connected between $V_{DSP}$ and $V_{SS}$, connects to input and output buffers 50, receives input signals from five-volt analog subsystem 60, and provides output signals to level shifter 44 via signal lines 33b, one of which is signal CLOCK, which is also provided to regulated charge pump 43. Level shifter 44 receives power supply voltages $V_{DSP}$ and $V_{DD}$ and is coupled to $V_{SS}$, and level shifts the signals conducted on signal lines 33b and provides corresponding signals 33c to subsystem 60. PCM codec 29 is a conventional PCM codec modified to separate internal circuitry in accordance with differing power supply requirements. In PCM codec 29, five-volt analog subsystem 60 performs all the functions of a conventional PCM codec except the special functions performed by subsystem 61 as described below. Subsystem 60 is connected between $V_{DD}$ and $V_{SS}$, receives a microphone signal via input signal lines 34, and connects to subsystem 51 via signal lines 33a. Battery-powered analog subsystem 61 is connected between $V_{BAT}$ and $V_{SS}$ and is connected to input and output signal lines 35'.

Mixed signal processing system 22 has several advantages over known mixed signal processing systems. First, mixed signal processing system 22 reduces power consumption. Voltage regulator 41 provides a power supply voltage, $V_{DSP}$, to subsystem 51 which is substantially constant with respect to changes in $V_{BAT}$. By setting the power supply voltage near the minimum voltage at which the circuitry will operate, power consumption of digital subsystem 51 is minimized. At the same time, digital subsystem 51 performs the ADPCM transcoder functions (except the input and output functions) quickly enough at ($V_{DSP}$=3.0 volts) to meet the specifications, including speech compression and decompression in real time. In a preferred embodiment, subsystem 51 uses CMOS digital logic. CMOS logic circuitry may be designed to operate at high speed and low power supply voltage, such as at 3.0 volts. However, such circuitry consumes large amounts of power when the power supply voltage is increased to around 4.0 or 5.0 volts, and in addition, integrated circuit area increases due to a need for additional area for power supply busses. At reduced power consumption levels, junction temperatures are reduced; thus, integrated circuit packaging specifications may be relaxed and reliability is enhanced. An added benefit is that digital subsystem 51 is designed to operate within a narrow range of power supply voltages, simplifying circuit design.

Second, mixed signal processing system 22 performs analog functions reliably despite changes in $V_{BAT}$. Regulated charge pump 43 provides a power supply voltage, $V_{DD}$, having a voltage high enough for desired analog operation. At $V_{DD}$ of 5.0 volts, analog circuitry in analog subsystem 60 has sufficient headroom to operate linearly. In addition, harmfully high voltages provided by conventional integer charge pumping are avoided. As an example, if analog circuitry were powered directly from $V_{BAT}$, performance would diminish if $V_{BAT}$ were near the low end of its range (about 2.7 volts). On the other hand, if a standard 2×integer charge pump were used to power the analog circuitry, then the voltage range would be from 5.4 to about 10.8 volts. At the high end of the range, reliability is reduced.

Third, mixed signal processing system 22 reliably interfaces to external circuitry. Mixed signal processing system 22 separates input and output buffers 50 from digital subsystem 51. While digital subsystem 51 is connected to $V_{DSP}$, input and output buffers 50 are connected between $V_{BAT}$ and $V_{SS}$. Thus, logic high output signal levels of input and output buffers 50 correspond to the output signal levels of other devices, such as microprocessor 27. As illustrated in FIG. 1, ADPCM codec 28 is connected both to time division duplex block 26 and to microprocessor 27. Internally, level shifter 44 similarly increases the logic levels of digital signals provided by digital subsystem 51 to analog subsystem 60.

Fourth, mixed signal processing system 22 reduces power consumption by powering analog subsystem 60 from $V_{DD}$ and battery-powered output subsystem 61 from $V_{BAT}$. Circuitry in analog subsystem 61 includes drivers which require a high current drive. For example, subsystem 61 includes drivers to provide analog outputs to speaker 31 of FIG. 1. By separating the circuitry, efficiency losses introduced by regulated charge pump 43 do not include losses from the high current drivers.

Figure 3:
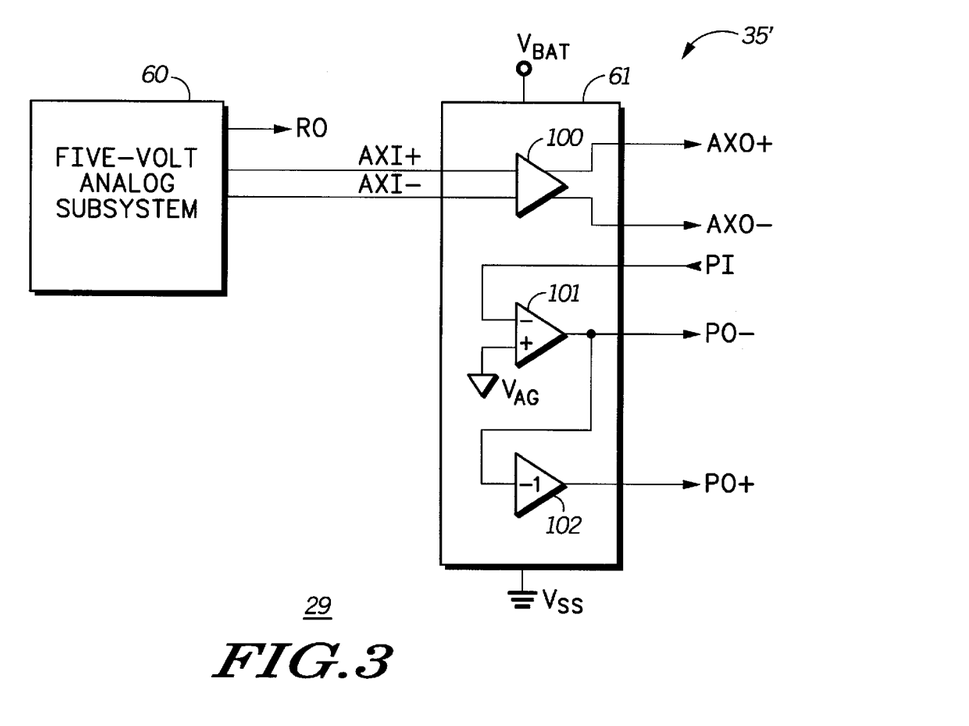
FIG. 3 illustrates in partial block form and partial schematic form the PCM codec of FIG. 2.

FIG. 3 illustrates in partial block form and partial schematic form PCM codec 29. Illustrated in FIG. 3 is analog subsystem 60 and battery-powered analog subsystem 61, which includes amplifiers 100, 101, and 102. Analog subsystem 60 provides receive analog output signals labelled "RO", "AXI+", and "AXI−". AXI+ and AXI− form a differential representation of the analog output signal. In subsystem 61, amplifier 100 is a differential amplifier which receives signals AXI+ and AXI− on input terminals and provides a signal labelled "AXO+" on a positive output terminal thereof, and a signal labelled "AXO−" on a negative output terminal thereof. Amplifier 101 is an operational amplifier which receives an input signal labelled "PI" on a negative input terminal thereof, a signal voltage labelled "$V_{AG}$" on a positive input terminal thereof, and provides a signal labelled "PO−". $V_{AG}$ is an analog ground reference voltage which has a value of approximately $V_{BAT}/2$. Amplifier 102 is n inverting amplifier which receives signal PO− on an input terminal thereof, and provides a signal labelled "PO+" on an output terminal thereof. Signals AXO+ and AXO− may be used to drive an output device such as a ringer or the like (not shown in FIG. 1). Input signal PI typically receives signal RO and is used with external resistors to set the gain of push-pull signals PO+ and PO− provided by amplifiers 101 and 102. Amplifiers 101 and 102 are large enough to drive a telephone handset earpiece or small speaker. Powering subsystem 61 from $V_{BAT}$, instead of $V_{DD}$, reduces power consumption by preventing a large power loss due to the efficiency of regulated charge pump 43 being less than 100%.

Figure 4:
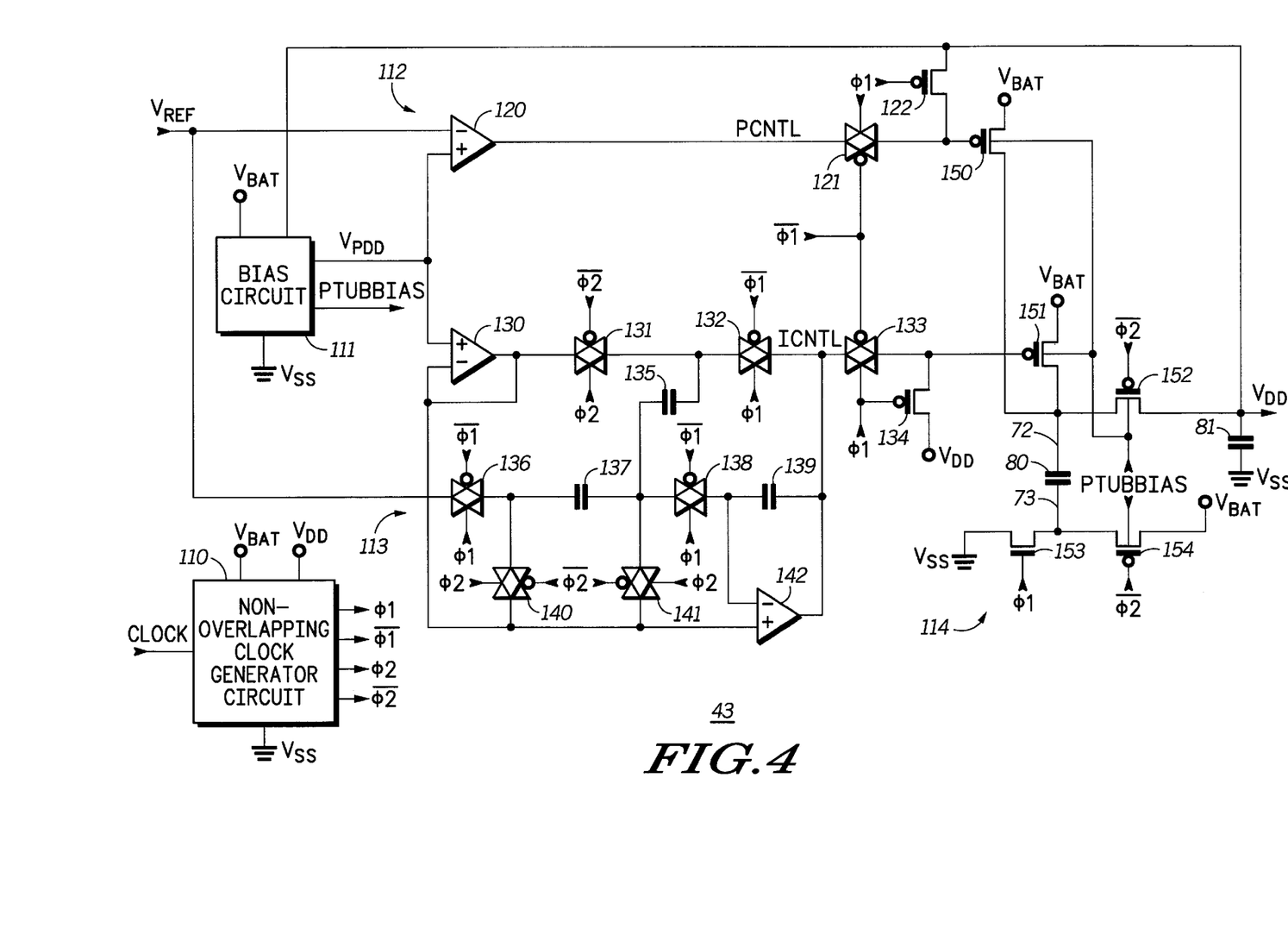
FIG. 4 illustrates in partial schematic form and partial block form the regulated charge pump of FIG. 2.

FIG. 4 illustrates in partial schematic form and partial block form regulated charge pump 43 of FIG. 2. Regulated charge pump 43 includes generally a non-overlapping clock generator circuit 110, a bias circuit 111, a proportional portion 112, an integrating portion 113, and a charge pump core 114. Proportional portion 112 includes an amplifier 120, a transmission gate 121, and a P-channel transistor 122. Integrating portion 113 includes an amplifier 130, transmission gates 131, 132, and 133, a P-channel transistor 134, a capacitor 135, a transmission gate 136, a capacitor 137, a transmission gate 138, a capacitor 139, transmission gates 140 and 141, and an amplifier 142. Charge pump core 114 includes capacitor 80, P-channel transistors 150, 151, and 152, an N-channel transistor 153, a P-channel transistor 154, and capacitor 81.

Non-overlapping clock circuit 110 receives signal CLOCK, is coupled to power supply voltages $V_{BAT}$, $V_{DD}$, and $V_{SS}$, and provides non-overlapping clock signals labelled "Φ1","$\overline{Φ1}$", "Φ2", and "$\overline{Φ2}$", which are level-shifted to $V_{DD}$. Bias circuit 111 is coupled between power supply terminals $V_{BAT}$ and $V_{SS}$, receives power supply voltage $V_{DD}$, and provides an output signal labelled "$V_{PDD}$" and an output signal labelled "PTUBBIAS".

In proportional portion 112, amplifier 120 is an operational transconductance amplifier (OTA) having a negative input terminal for receiving signal $V_{REF}$, a positive input terminal for receiving signal $V_{PDD}$, and an output terminal for providing a signal labelled "PCNTL". Transmission gate 121 has a first current terminal for receiving signal PCNTL, a second current terminal, a positive control terminal for receiving signal Φ1, and a negative control terminal for receiving signal $\overline{Φ1}$. Transistor 122 has a source for receiving power supply voltage $V_{DD}$, a gate for receiving signal Φ1, and a drain connected to the second current terminal of transmission gate 121.

In integrating portion 113, amplifier 130 has a positive input terminal for receiving signal $V_{PDD}$, a negative input terminal, and an output terminal connected to the negative input terminal of amplifier 130. Transmission gate 131 has a first current terminal connected to the output terminal of amplifier 130, a second current terminal, a positive control terminal for receiving signal Φ2, and a negative control terminal for receiving signal $\overline{Φ2}$. Transmission gate 132 has a first current terminal connected to the second current terminal of transmission gate 131, a second current terminal for providing a signal labelled "ICNTL", a positive control terminal for receiving signal Φ1, and a negative control terminal for receiving signal $\overline{Φ1}$. Transmission gate 133 has a first current terminal for receiving signal ICNTL, a second current terminal, a positive control terminal for receiving signal Φ1, and a negative control terminal for receiving signal $\overline{Φ1}$. Transistor 134 has a source for receiving power supply voltage $V_{DD}$, a gate for receiving signal Φ1, and a drain connected to the second current terminal of transmission gate 133. Capacitor 135 has a first terminal connected to the second current terminal of transmission gate 131, and a second terminal. Transmission gate 136 has a first current terminal for receiving signal $V_{REF}$, a second current terminal, a positive control terminal for receiving signal Φ1, and a negative control terminal for receiving signal $\overline{Φ1}$. Capacitor 137 has a first terminal connected to the second current terminal of transmission gate 136, and a second terminal connected to the second terminal of capacitor 135. Transmission gate 138 has a first current terminal connected to the second terminals of capacitors 135 and 137, a second current terminal, a positive control terminal for receiving signal Φ1, and a negative control terminal for receiving signal $\overline{Φ1}$. Capacitor 139 has a first terminal connected to the second current terminal of transmission gate 138, and a second terminal connected to the second current terminal of transmission gate 132. Transmission gate 140 has a first current terminal connected to the output terminal of amplifier 130, a second current terminal connected to the second current terminal of transmission gate 136, a positive control terminal for receiving signal Φ2, and a negative control terminal for receiving signal $\overline{Φ2}$. Transmission gate 141 has a first current terminal connected to the output terminal of amplifier 130, a second current terminal connected to the second terminals of capacitors 135 and 137, a positive control terminal for receiving signal Φ2, and a negative control terminal for receiving signal $\overline{Φ2}$. Amplifier 142 has a negative input terminal connected to the second current terminal of transmission gate 138, a positive input terminal connected to the output terminal of amplifier 130, and an output terminal connected to the second current terminal of transmission gate 132 and to the second terminal of capacitor 139.

In charge pump core 114, transistor 150 has a source connected to $V_{BAT}$, a gate connected to the second current terminal of transmission gate 121, a drain, and a bulk or well receiving signal PIBUBIAS. Transistor 151 has a source connected to $V_{BAT}$, a gate connected to the second current terminal of transmission gate 133, a drain connected to the drain of transistor 150 at terminal 72, and a bulk or well receiving signal PTUBBIAS. Transistor 152 has a first current electrode connected to the drains of transistors 150 and 151, a gate for receiving signal $\overline{\Phi 2}$, a second current electrode for providing power supply voltage $V_{DD}$, and a bulk or well receiving signal PTUBBIAS. Note that which current electrode is designated as source or drain depends on the voltages applied. Capacitor 80 has a first terminal connected to terminal 72, and a second terminal connected to terminal 73, as previously illustrated. Transistor 153 has a drain connected to the second terminal of capacitor 80 at node 73, a gate for receiving signal $\Phi 1$, and a source connected to $V_{SS}$. Transistor 154 has a source connected to power supply voltage $V_{BAT}$, a gate for receiving signal $\overline{\Phi 1}$, a drain connected to the drain of transistor 153, and a bulk or well connected to PTUBBIAS. Capacitor 81 has a first terminal connected to the second current electrode of transistor 152 via terminal 74, and a second terminal connected to $V_{SS}$, as previously illustrated.

Circuit 110 is a conventional non-overlapping dock generator circuit, which receives signal CLOCK, and provides four clock signals labelled $\Phi 1$, $\overline{\Phi 1}$, $\Phi 2$, and $\overline{\Phi 2}$, which are level shifted to $V_{DD}$. Because of the non-overlap, signal $\Phi 1$ is not the same as signal $\overline{\Phi 2}$, and signal $\Phi 2$ is not the same as signal $\overline{\Phi 1}$. As previously illustrated with respect to FIG. 2, capacitors 80 and 81 are coupled to regulated charge pump circuit 43 via terminals 72 and 73, and 74 and 71, respectively. Although capacitors 80 and 81 may be viewed as integral parts of regulated charge pump 43, they are preferably external to an integrated circuit which includes regulated charge pump 43 because of their required size. For example, in the illustrated embodiment, capacitors 80 and 81 have values of approximately 0.1 and 1.0 microfarads, respectively, and thus it is impractical to build such capacitors on an integrated circuit.

Charge pump core 114 uses charging capacitor 80 to provide voltage $V_{DD}$ above voltage $V_{BAT}$. However, proportional portion 112 and integrating portion 113 alter the operation of charge pump core 114 to integrally regulate VDD. During $\Phi 1$ ($\Phi 1$ is active), transistor 153 is conductive and couples the second terminal of capacitor 80 to $V_{SS}$. In a conventional charge pump design, a single transistor would also couple the first terminal of capacitor 80 to $V_{BAT}$ during $\Phi 1$. $\overline{\Phi 2}$ makes transistor 152 nonconductive, isolating the first terminal of capacitor 81 from $V_{DD}$. Thus, during $\Phi 1$, $V_{DD}$ is maintained by holding capacitor 81. Transistor 154 is also nonconductive. However, during $\Phi 2$($\Phi 2$ active), transistor 153 is inactive, and transistor 154 is conductive and connects the second terminal of capacitor 80 to $V_{BAT}$. This action boosts the voltage at the first terminal of capacitor 80 to approximately twice $V_{BAT}$. Transistor 152 is also conductive, and the charge stored in capacitor 80 is dumped into holding capacitor 81. At the end of $\Phi 2$, transistor 152 becomes nonconductive and holding capacitor 81 maintains the level of $V_{DD}$. By repeating this operation, capacitor 81 eventually charges up to approximately twice $V_{BAT}$.

However, in regulated charge pump circuit 43, the conventional transistor from the first terminal of capacitor 80 to $V_{BAT}$ is replaced by transistors 150 and 151. Transistors 150 and 151 are made conductive in response to signals PCNTL and ICNTL, which are provided by proportional portion 112 and integrating portion 113. Amplifiers 120 and 142 have outputs reference to $V_{DD}$, whereas amplifier 130 has an output referenced to $V_{BAT}$. Proportional portion 112 makes transistor 150 proportionately conductive in response to a comparison of $V_{PDD}$ and $V_{REF}$. Portion 112 has a fast response to bring $V_{DD}$ to approximately a desired voltage. Integrating portion 113, however, operates somewhat slower to make transistor 151 proportionately conductive to bring $V_{DD}$ very close to the desired value. Thus, regulated charge pump 43 charge pumps $V_{BAT}$ and regulates the charge-pumped voltage to efficiently provide $V_{DD}$ at the desired voltage (+5.0 volts).

Bias circuit 111 provides $V_{PDD}$ at a predetermined fraction of a desired value of $V_{DD}$; the predetermined fraction is that fraction that makes $V_{PDD}$ equal to $V_{REF}$ when $V_{DD}$ is equal to its desired value. In the illustrated embodiment, the desired value of $V_{DD}$ is +5.0 volts, and the value of $V_{REF}$ is approximately 1.25 volts. Thus, in order to make $V_{PDD}$ equal to 1.25 volts when $V_{DD}$ is 5.0 volts, a fraction of 0.25 is applied. The accuracy of the fraction is determined by the technique used to generate it, which is described with reference to FIG. 5 below.

Amplifier 120 compares $V_{REF}$ to $V_{PDD}$. In the illustrated embodiment, amplifier 120 is an operational transconductance amplifier (OTA), whose output voltage varies in response to a difference in voltage between the positive and negative input terminals. The gate of transistor 150 provides a capacitive load, with transistor 122 providing a pullup to $V_{DD}$. During $\Phi 1$, transmission gate 121 is active to pass the signal PCNTL at the output of amplifier 120 to the gate of transistor 150. Amplifier 120 varies signal PCNTL until the voltages at the positive and negative input terminals are equal; thus, amplifier 120 makes transistor 150 differentially more or less conductive until $V_{DD}$ is approximately equal to its desired voltage. Proportional portion 112 operates very quickly in response to changes in load conditions on $V_{DD}$; however, amplifier 120 and transmission gate 121 introduce offsets which limit the accuracy of $V_{DD}$.

Integrating portion 113 adjusts the conductivity of transistor 151 to further increase the accuracy of $V_{DD}$. Integrating portion 113 is a switched capacitor (switched-C) differential integrator which integrates a difference between $V_{PDD}$ and $V_{REF}$ over time. While slower in response than proportional portion 112, integrating portion 113 includes the history of the signal levels, which eventually cancels the offset error of proportional portion 112. Amplifier 130 is a unity-gain differential amplifier which buffers signal $V_{PDD}$ and keeps integrating portion 113 from affecting the operation of proportional portion 112. At power up, signals PCNTL and ICNTL are low in potential, making transistors 150 and 151 strongly conductive to reach the desired value of $V_{DD}$ quicker. Because of battery life reduction and a voltage drop in the power supply voltages due to a rapid change in current, known as a di/dt voltage drop, it is important to include a resistance in series with the gates of transistors 150 and 151 to decrease the switching speed somewhat (not shown in FIG. 4).

Regulated charge pump 43 provides $V_{DD}$ at a desired value of approximately 5.0 volts without having to first charge pump the battery voltage to a multiple thereof, and then to regulate or damp the charge-pumped voltage to a desired, lower voltage. This regulation can be very advantageous for some values of $V_{BAT}$. For example, immediately after recharge, $V_{BAT}$ may be approximately 5.4 volts. A conventional voltage-doubling charge pump circuit provides a voltage of 10.8 volts, which may be harmful to circuitry designed to operate at 5.0 volts. Furthermore, conventional methods of shunt regulation or clamping also waste current. Regulated charge pump 43 provides regulation such that $V_{DD}$ is never doubled. Regulated charge pump 43 also does not use damping devices such as Zener diodes to limit the output voltage, but rather uses proportional and integrating action to provide $V_{DD}$ with high accuracy and high efficiency.

Figure 5:
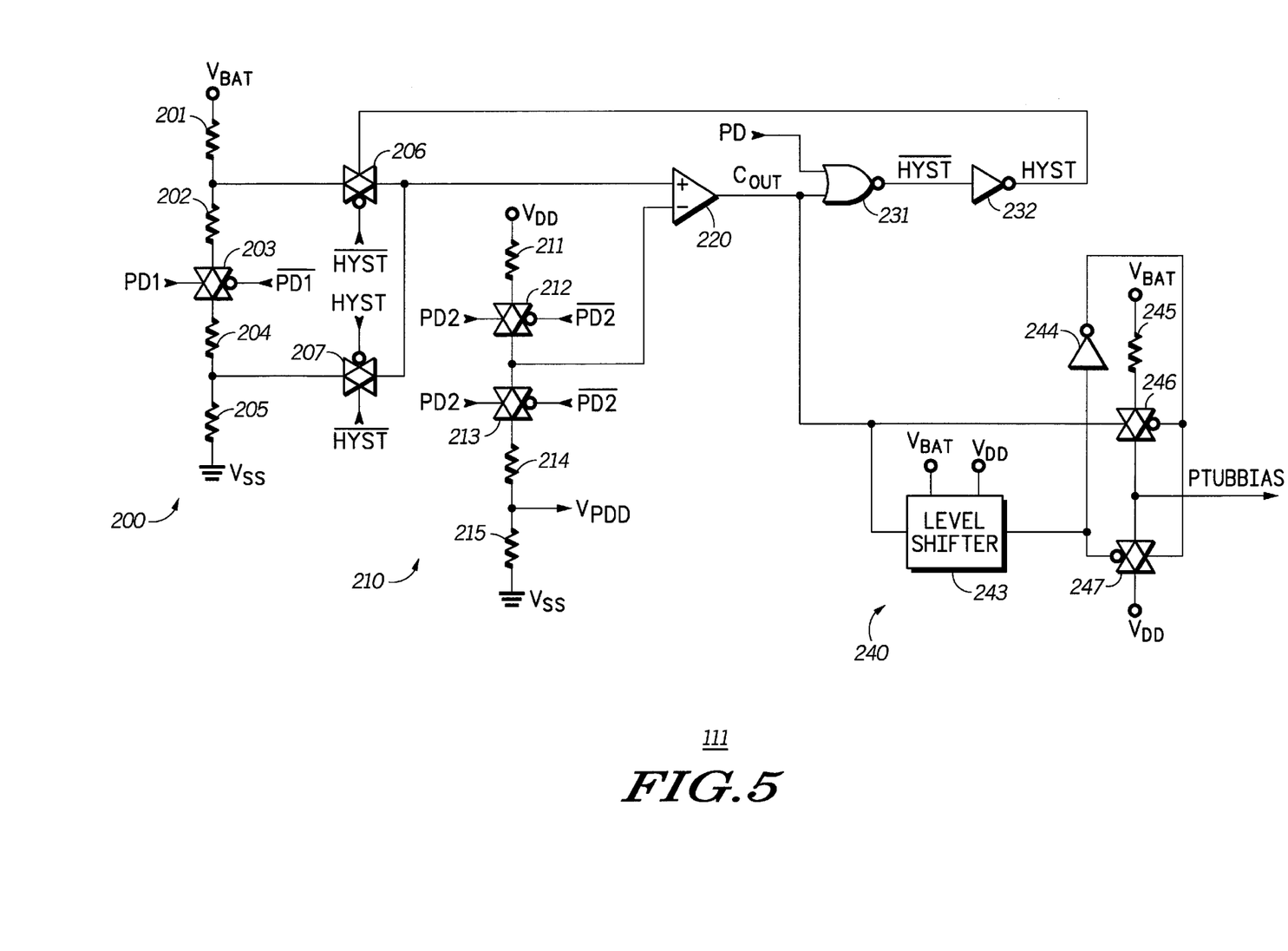
FIG. 5 illustrates in partial schematic form and partial block form the bias circuit used in the regulated charge pump of FIG. 4.

FIG. 5 illustrates in partial schematic form and partial block form bias circuit 111 used in regulated charge pump 43 of FIG. 4. Bias circuit 111 includes generally a first resistor string circuit 200, a second resistor string circuit 210, a comparator 220, a hysteresis control circuit 230, and a bias generator circuit 240. First resistor string circuit 200 includes resistors 201 and 202, a transmission gate 203, resistors 204 and 205, and transmission gates 206 and 207. Second resistor string circuit 210 includes a resistor 211, transmission gates 212 and 213, and resistors 214 and 215. Hysteresis control circuit 230 includes a NOR gate 231 and an inverter 232. Bias generator circuit 240 includes a level shifter 243, an inverter 244, a resistor 245, and transmission gates 246 and 247.

In first resistor string circuit 200, resistor 201 has a first terminal connected to $V_{BAT}$, and a second terminal. Resistor 202 has a first terminal connected to the second terminal of resistor 201, and a second terminal. Transmission gate 203 has a first current terminal connected to the second terminal of resistor 202, a second current terminal, a positive control terminal for receiving a signal labelled "PD1", and a negative control terminal for receiving a signal labelled "$\overline{PD1}$". Resistor 204 has a first terminal connected to the second current terminal of transmission gate 203, and a second terminal. Resistor 205 has a first terminal connected to the second terminal of resistor 204, and a second terminal connected to $V_{SS}$. Transmission gate 206 has a first current terminal connected to the second terminal of resistor 201, a second current terminal, a positive control terminal for receiving a signal labelled "HYST", and a negative control terminal for receiving a signal labelled "$\overline{HYST}$". Transmission gate 207 has a first current terminal connected to the second terminal of resistor 204, a second current terminal connected to the second current terminal of transmission gate 206, a positive control terminal for receiving signal "$\overline{HYST}$", and a negative control terminal for receiving signal HYST.

In second resistor string circuit 210, resistor 211 has a first terminal for receiving power supply voltage $V_{DD}$, and a second terminal. Transmission gate 212 has a first current terminal connected to the second terminal of resistor 211, a second current terminal, a positive control terminal for receiving a signal labelled "PD2", and a negative control terminal for receiving a signal labelled $\overline{PD2}$. Transmission gate 213 has a first current terminal connected to the second current terminal of transmission gate 212, a second current terminal, a positive control terminal for receiving signal PD2, and a negative control terminal for receiving signal $\overline{PD2}$. Resistor 214 has a first terminal connected to the second current terminal of transmission gate 213, and a second terminal for providing signal $V_{PDD}$. Resistor 215 has a first terminal connected to the second terminal of resistor 214, and a second terminal connected to $V_{SS}$.

Comparator 220 has a positive input terminal connected to the second current terminal of transmission gate 206, a negative input terminal connected to the second current terminal of transmission gate 212, and an output terminal for providing a signal labelled "$C_{OUT}$". In hysteresis control circuit 230, NOR gate 231 has a first input terminal for receiving a signal labelled "PD", a second input terminal connected to the output terminal of comparator 220 for receiving signal $C_{OUT}$ thereon, and an output terminal for providing signal "$\overline{HYST}$". Inverter 232 has an input terminal connected to the output terminal of NOR gate 231, and an output terminal for providing signal HYST.

In bias generator circuit 240, level shifter 243 is connected to the output terminal of comparator 220, and provides an output signal on an output terminal thereof. Inverter 244 has an input terminal connected to the output terminal of level shifter 243, and an output terminal. Resistor 245 has a first terminal connected to $V_{BAT}$, and a second terminal. Transmission gate 246 has a first current terminal connected to the second terminal of resistor 245, a second current terminal for providing signal PTUBBIAS, a positive control terminal connected to the output terminal of comparator 220, and a negative control terminal connected to the output terminal of inverter 244. Transmission gate 247 has a first current terminal connected to the second current terminal of transmission gate 246, a second current terminal for receiving power supply voltage $V_{DD}$, a positive control terminal connected to the output terminal of inverter 244, and a negative control terminal connected to the output terminal of level shifter 243.

Bias circuit 111 performs two functions. First, bias circuit 111 provides signal $V_{PDD}$ for use in the proportional and integrating functions of regulated charge pump 43. Second, bias circuit 111 provides signal PTUBBIAS to bias the bulk or well of P-channel transistors in regulated charge pump 43, namely transistors 150, 151, 152, and 154, with $V_{BAT}$ or $V_{DD}$, whichever is greater. In order to understand the remainder of the operation, it is first necessary to describe the control signal generation. Signal PD is a powerdown indication active at a logic high. Signal PD1 is equivalent to a logical AND of signals PD and $C_{OUT}$ and is active at a logic low. Signal PD2 is equivalent to signal PD1 but is level-shifted to $V_{DD}$ and is active at a logic low.

Resistor string circuit 210 performs the first function of providing signal $V_{PDD}$. When control signals PD2 and $\overline{PD2}$ are inactive, $V_{PDD}$ is provided as the product of a resistive voltage division between resistors 211, 214, and 215. Thus, $$V_{PDD}=V_{DD}(R_{215}/(R_{211}+R_{214}+R_{215}))$$

where $R_{211}$ is the resistance of resistor 211, $R_{214}$ is the resistance of resistor 214, and $R_{215}$ is the resistance of resistor 215. By choosing proper resistor values, $V_{PDD}$ can be made equal to 0.25 $V_{DD}$; thus, for a value of $V_{DD}$=5.0 volts, $V_{PDD}$ is equal to 1.25 volts. When regulated charge pump 43 alters $V_{DD}$ until $V_{REF}$ =$V_{PDD}$, and since $V_{REF}$= 1.25 volts, resistor string circuit 210 assures that $V_{DD}$ is equal to 5.0 volts with high accuracy.

It is important to provide relatively high values for resistors 211, 214, and 215 to limit the current flowing therethrough. In order to provide the high resistances, lightly-doped diffusion or well resistors are preferred. These resistors are preferable to polysilicon resistors because, although polysilicon resistors are more accurate, they require much more circuit area. For example, a typical resistivity of a polysilicon resistor is approximately 20 ohms per square, whereas the resistivity of a well resistor is approximately 1.4 kilohms per square. In the preferred embodiment, $R_{211}$ is 105 kilohms, $R_{214}$ is 53.2 kilohms, and $R_{215}$ is 51.8 kilohms. Thus, low current flow is assured.

The second function of bias circuit 111 is to provide voltage PITUBBIAS in order to assure reliable operation of regulated charge pump 43 under varying power supply conditions, such as during power up. Immediately after power up, $V_{DD}$ has not yet attained its target value of 5.0 volts and may in fact be very close to zero. If N-wells were always biased to $V_{DD}$, then immediately after power up a diffusion-to-well PN junction may become forward biased, which would be harmful to the integrated circuit. Thus, bias generator circuit 240 provides PTUBBIAS at a voltage of essentially $V_{BAT}$ when either $V_{BAT}$ is greater than $V_{DD}$ or when signal PD is active.

In order to compare $V_{DD}$ to $V_{BAT}$, resistor string circuit 200 performs a similar voltage division as resistor string circuit 210. There is one difference, however. Resistor string circuit 200 includes hysteresis. After powerup (PD is inactive), when the battery voltage $V_{BAT}$ exceeds $V_{DD}$, signal $C_{OUT}$ is activated. Since PD is inactive, hysteresis control circuit 230 activates signal $\overline{HYST}$ at a logic low, and activates signal HYST at a logic high, making transmission gate 206 active and transmission gate 207 inactive. Thus, the voltage proportional to $V_{BAT}$ applied to the positive input terminal of comparator 220 is taken from the second terminal of resistor 201 in resistor string circuit 200. However, as soon as $V_{PDD}$ exceeds the potential of the second terminal of resistor 201, $C_{OUT}$ becomes negated. Hysteresis control circuit 230 inactivates $\overline{HYST}$ at a logic high, and inactivates signal HYST at a logic low. Transmission gate 206 is inactive, and transmission gate 207 is active and the proportional voltage is now taken from the second terminal of resistor 204. Since now an additional voltage drop is introduced by resistors 202 and 204, $V_{DD}$ must decrease by an additional amount before $C_{OUT}$ is again activated. Thus, the hysteresis provided by bias circuit 111 prevents instability under varying power supply conditions.

While the invention has been described in the context of a preferred embodiment, it will be apparent to those skilled in the art that the present invention may be modified in numerous ways and may assume many embodiments other than that specifically set out and described above. For example, $V_{SS}$ could be the positive power supply with the other power supply voltages $V_{BAT}$, $V_{DD}$, and $V_{DSP}$ at negative voltages in reference thereto. Furthermore, although battery voltage $V_{BAT}$ was illustrated, mixed signal processing system 22 provides the same advantages when any highly variable power supply voltage is used. In addition, a different number and type of batteries may be used, as long as the voltage during the operating life is at least 2.7 volts. In another embodiment, a portion of digital subsystem 51 may be coupled to $V_{DD}$ to maximize speed. Also, $V_{DD}$ could be generated by a switching regulator, also called a switch mode regulator. Accordingly, it is intended by the appended claims to cover all modifications of the invention which fall within the true spirit and scope of the invention.

We claim:

1. A mixed signal processing system comprising:
   first regulation means coupled to first and common power supply voltage terminals respectively providing first and common power supply voltages thereon, for providing a second power supply voltage at a first predetermined potential referenced to said common power supply voltage, an absolute value of said first predetermined potential being less than an absolute value of a nominal potential of said first power supply voltage referenced to said common power supply voltage and characterized as being substantially constant with respect to changes in said first power supply voltage;
   means coupled to said first and common power supply voltage terminals, for providing a third power supply voltage at a second predetermined potential referenced to said common power supply voltage, an absolute value of said second predetermined potential being greater than said absolute value of said nominal potential, and including second regulation means for keeping said second predetermined potential substantially constant with respect to changes in said first power supply voltage;
   a digital subsystem coupled to said common power supply voltage terminal for receiving said second power supply voltage at a power supply voltage terminal thereof and a digital signal at an input terminal thereof; and
   an analog subsystem coupled to said digital subsystem and to said common power supply voltage terminal, for receiving said third power supply voltage at a power supply voltage terminal thereof and an analog signal at an input terminal thereof.

2. The mixed signal processing system of claim 1 wherein said first power supply voltage terminal receives a battery voltage.

3. The mixed signal processing system of claim 1 further comprising input/output means coupled to said first and common power supply voltage terminals and to said digital subsystem, for receiving at least one signal from said digital subsystem and for providing at least one corresponding output signal of the mixed signal processing system in response.

4. The mixed signal processing system of claim 3 wherein said input/output means further receives at least one input signal of the mixed signal processing system and provides at least one corresponding buffered input signal to said digital subsystem in response.

5. The mixed signal processing system of claim 1 further comprising a level shifter coupled to said digital subsystem and to said analog subsystem, for receiving at least one digital signal from said digital subsystem and for providing at least one corresponding level-shifted digital signal to said analog subsystem in response.

6. The mixed signal processing system of claim 1 further comprising a bandgap voltage reference coupled to said first and common power supply voltage terminals, for providing a reference voltage to said means for providing a second power supply voltage and to said means for providing said third power supply voltage.

7. The mixed signal processing system of claim 1 further comprising a second analog subsystem coupled to said first and common power supply voltage terminals and to said analog subsystem, for providing at least one output signal of the mixed signal processing system in response to an output signal of said analog subsystem.

8. A mixed signal processing system comprising:
   a voltage regulator coupled to first and common power supply voltage terminals for respectively receiving first and common power supply voltages thereon, for regulating said first power supply voltage to provide a second power supply voltage at a first predetermined potential;
   a regulated charge pump coupled to said first and common power supply voltage terminals, for charge pumping said first power supply voltage and for regulating said charge-pumped voltage to provide a third power supply voltage;
   a digital subsystem coupled to said common power supply voltage terminal for receiving said second power supply voltage at a power supply voltage terminal thereof and a digital signal at an input terminal thereof; and
   an analog subsystem coupled to said digital subsystem and to said common power supply voltage terminal, for receiving said third power supply voltage at a power supply voltage terminal thereof and an analog signal at an input terminal thereof.

9. The mixed signal processing system of claim 8 further comprising a level shifter coupled to said common power supply voltage terminal and receiving said second and third power supply voltages, for level shifting at least one output signal provided by said digital subsystem and providing said level-shifted signal to said analog subsystem.

10. The mixed signal processing system of claim 8 further comprising at least one buffer coupled to said first and common power supply voltage terminals and to said digital subsystem, for providing at least one digital output signal in response to a corresponding signal provided by said digital subsystem.

11. The mixed signal processing system of claim 8 further comprising a second analog subsystem coupled to said first and common power supply voltage terminals and to said analog subsystem, for providing at least one analog output signal of the mixed signal processing system in response to a corresponding signal provided by said analog subsystem.

12. A method for improving performance of a mixed signal processing system powered by an external voltage, comprising the steps of:

regulating the external voltage to a first predetermined level;

providing said regulated external voltage to a digital system of the mixed signal processing system;

providing at least one digital signal to said digital system;

charge pumping the external voltage;

regulating said charge-pumped external voltage to a second predetermined level;

providing said regulated charge-pumped external voltage to an analog system of the mixed signal processing system; and providing at least one analog signal to said analog system.

13. The method of claim 12 further comprising the steps of:

coupling at least one buffer to said digital system; and powering said at least one buffer with the external voltage.

14. The method of claim 12 further comprising the steps of:

coupling an analog subsystem to said analog system; and powering said analog subsystem with the external voltage.

15. A method for powering a mixed signal processing system comprising the steps of:

providing a battery voltage between first and common power supply voltage terminals;

regulating said battery voltage to provide a second power supply voltage;

charge pumping said battery voltage;

regulating said charge-pumped battery voltage to provide a third power supply voltage;

providing said second power supply voltage to a digital subsystem of the mixed signal processing system;

providing at least one digital signal to said digital subsystem;

providing said third power supply voltage to an analog subsystem of the mixed signal processing system and providing at least one analog signal to said analog subsystem.

16. The method of claim 15 further comprising the steps of:

level-shifting at least one output signal of said digital subsystem; and providing said at least one level-shifted output signal to said analog subsystem.

17. The method of claim 15 further comprising the steps of:

coupling at least one buffer to said digital subsystem; and powering said at least one buffer with said battery voltage.

18. A mixed signal processing system comprising:

a voltage regulator coupled to first and common power supply voltage terminals respectively receiving first and common power supply voltages thereon, for regulating said first power supply voltage to provide a second power supply voltage at a first predetermined potential;

a regulated charge pump coupled to said first and common power supply voltage terminals, for charge pumping said first power supply voltage and for regulating said charge-pumped voltage to provide a third power supply voltage;

a digital subsystem coupled to said common power supply voltage terminal for receiving said second power supply voltage at a power supply voltage terminal thereof and a digital signal at an input terminal thereof; and an analog subsystem coupled to said digital subsystem and to said common power supply voltage terminal, for receiving said third power supply voltage at a power supply voltage terminal thereof and for providing an analog signal at an output terminal thereof.

19. The mixed signal processing system of claim 18 further comprising a level shifter coupled to said common, second, and third power supply voltage terminals, having an input terminal for receiving a digital output signal from said digital subsystem, and an output terminal for providing a level-shifted signal to said analog subsystem in response thereto.

20. The mixed signal processing system of claim 18 further comprising a second analog subsystem coupled to said first and common power supply voltage terminals, having an input terminal coupled to said output terminal of said analog subsystem, and an output terminal for providing an output signal of the mixed signal processing system.

* * * * *